April 13, 1965

R. D. WILLIAMS ETAL 3,177,737

TRANSMISSION CONTROL

Filed Aug. 8, 1962

INVENTORS
Richard D. Williams,
Nicholas J. Plumeri, &
BY Homer V. Krautwurst

A. M. Heiter

ATTORNEY

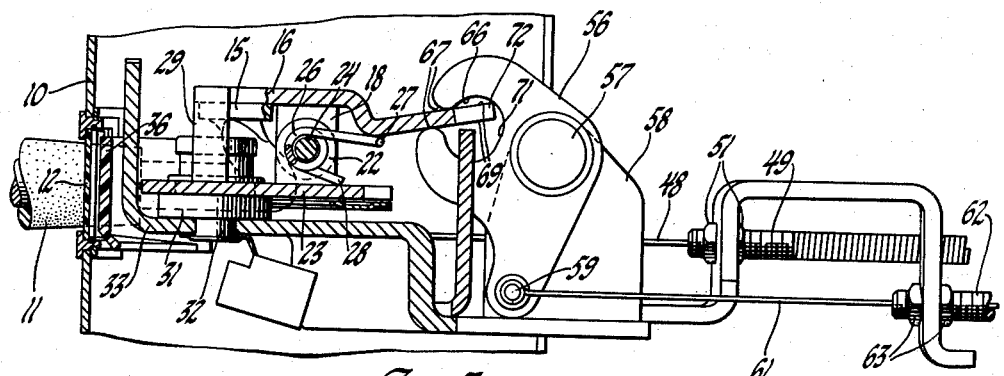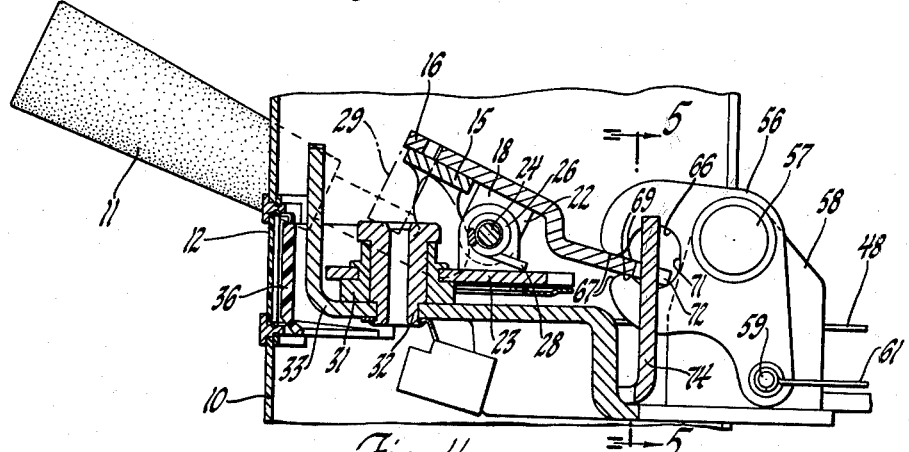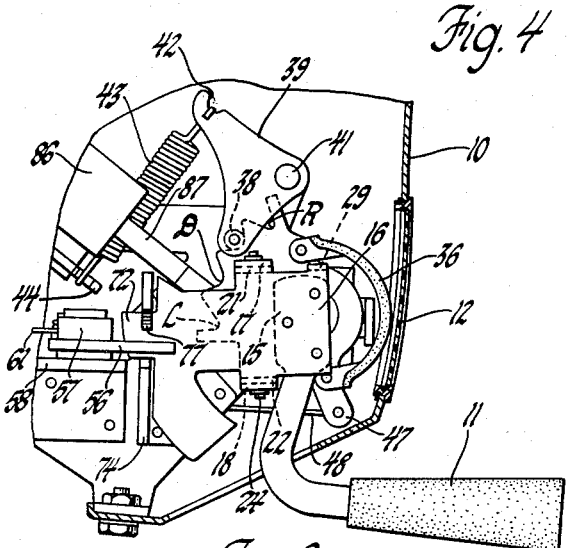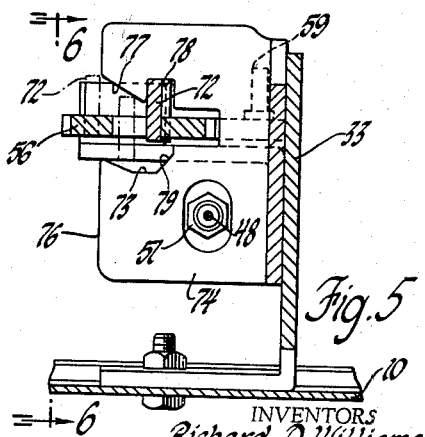

3,177,737
TRANSMISSION CONTROL
Richard D. Williams, Fairport, and Nicholas J. Plumeri and Homer V. Krautwurst, Rochester, N.Y., assignors to General Motors Corporation, Detroit, Mich., a corporation of Delaware
Filed Aug. 8, 1962, Ser. No. 215,691
11 Claims. (Cl. 74—471)

This invention relates to control linkages and more particularly to transmission control linkages.

This control linkage is particularly adapted for moving a first controlled element through a plurality of positions, such as the manual selector valve of an automatic transmission and for moving a second controlled element between two positions, such as the park control of an automatic transmission, only when the first controlled element is in a particular position, such as neutral. In the preferred embodiment, the control handle is rotated to a plurality of positions and held in each position, i.e.; Low, Drive, Neutral and Reverse, by a detent to control the shift selector mechanism. The control handle may be laterally moved, only when in the neutral position, to actuate the park mechanism and is retained by a latch in this position. This lateral movement requires a slight rotary movement of the control handle against the biasing force of the detent mechanism to provide a biasing foce to engage the latch to hold the control handle in the park position.

An object of the invention is to provide in a control linkage a control lever movable in one direction through a plurality of positions having a detent mechanism to hold the control lever in each of said positions and the control lever also being transversely movable from one of the positions to engage a latch requiring a slight movement in the first direction so that the detent mechanism provides a bias to hold the latch engaged to hold the control lever in latched position.

Another object of the invention is to provide in a control linkage a control handle connected to rotate a sector plate having a detent mechanism to locate the sector plate in a plurality of positions and a pivotal mounting between the control handle and the sector plate permitting transverse swinging movement of the control handle, and an interlock mechanism preventing transverse movement of said control handle except from one position.

Another object of the invention is to provide in a control linkage a control movable in one path and movable in another path for latching in a position in said another path, and the movement in said another path requiring movement in the one path providing a biasing force to engage the latch.

These and other objects of the invention will be more apparent from the following description and drawing of a preferred embodiment of the invention.

FIGURE 3 is a section of FIGURE 2 on the line 3—3.

FIGURE 4 is a partial section similar to FIGURE 3 showing the control linkage in the park position.

FIGURE 5 is a partial sectional view of FIGURE 4 on the line 5—5.

FIGURE 6 is a partial sectional view of FIGURE 5 on the line 6—6.

Figure 1:
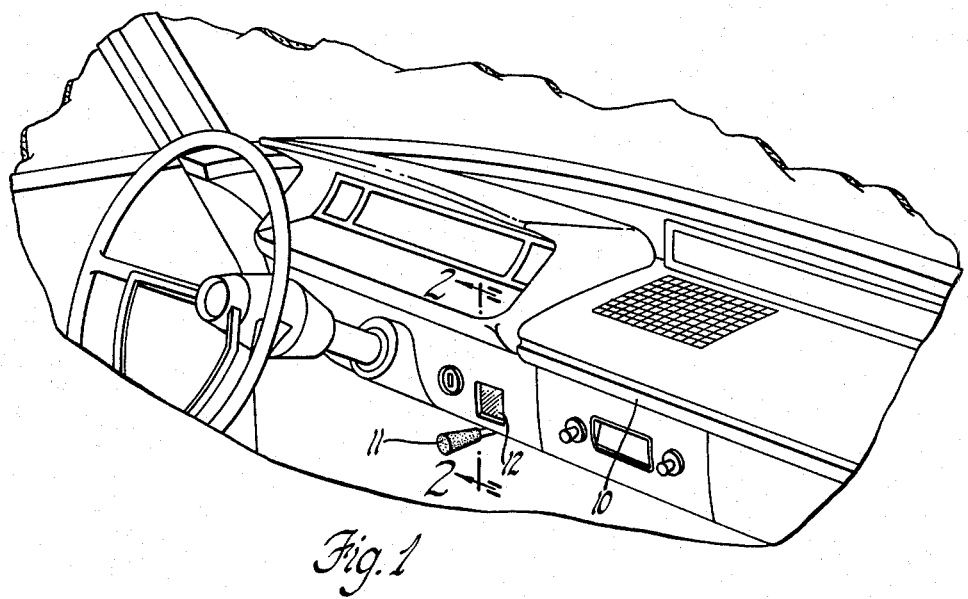
FIGURE 1 shows a typical vehicle arrangement employing the invention.
Figure 2:
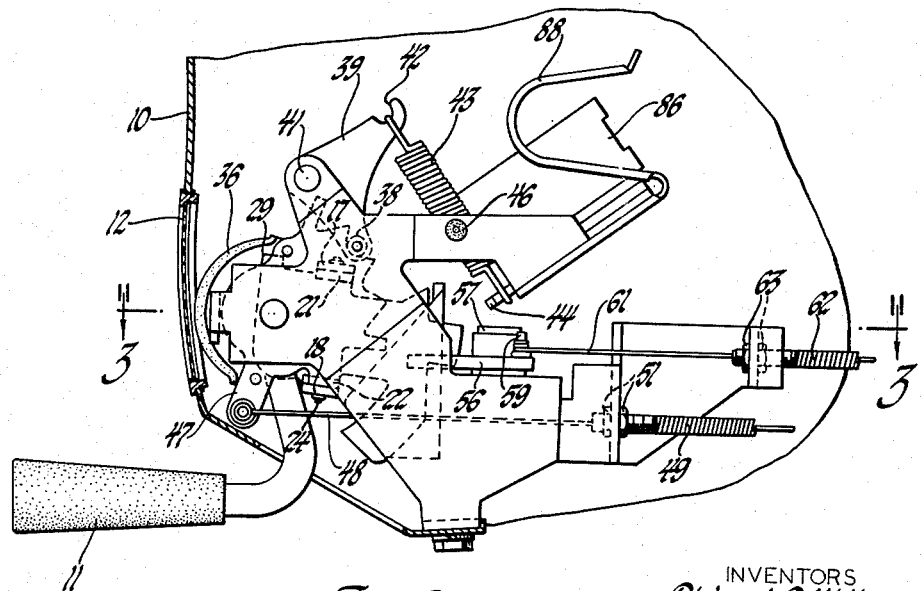
FIGURE 2 is a section of FIGURE 1 on the line 2—2 showing an elevation of the control linkage.

This control linkage is suitable for use in a transmission control system and may be located under the dash panel structure 10 of a vehicle with the control handle 11 projecting toward the operator from beneath the dash panel for easy access by the operator. A window 12 located in the dash panel permits viewing the control linkage indicator dial 36. The control handle 11, as best shown in FIGURES 3 and 6, has a fastening portion 15 suitably secured by spot welds to the hinged lever 16. The hinged lever has a pair of ears, ear 17 at the top and ear 18 at the bottom cooperating with a similar pair of ears 21 and 22 fixed to the detent lever 23. A pivot pin 24 extends through both pair of ears to pivotally connect the hinged lever to the detent plate. A coil spring 26 having one end 27 engaging the hinged lever and another end 28 engaging the detent lever biases the hinged plate for counterclockwise rotation as viewed in FIGURE 3 so that the hinged lever is biased from the position shown in FIGURE 4 to the position shown in FIGURE 3 where the stop 29, fixed to and projecting from hinged lever 16, engages the detent lever.

The detent lever is suitably secured to a bushing 31 rotatably mounted on a shaft 32 fixed to the support frame 33. The indicator dial 36 is suitably secured at each end to the detent lever and a suitable scale, R, N, D, L for reverse, neutral, drive and low, respectively, indicates the shift position of the transmission control through window 11. This arrangement is described in detail in application S.N. 832,088, filed August 6, 1959, now Patent No. 3,106,198 by Kai H. Hansen.

The detent lever 23 has a plurality of notches R, N, D and L, respectively, for reverse, neutral, drive and low positions. Neutral and drive notches are symmetrical and have sloping sides permitting movement against the biasing force tending to hold the control handle 11 in these positions. The reverse and low notches have the side adjacent neutral and drive respectively sloping to permit movement in a direction toward these drive positions while the other side is sufficiently steep to prevent further movement beyond this range of movement. A roller 38 fixed on the end of the bell crank type retainer lever 39 cooperates with the notches. The retainer lever 39 is pivotally mounted at the center by a pin 41 fixed on a portion of the support frame 33 and has an arm with a notch 42 providing an anchor for spring 43 anchored to the frame part 44 at its other end. A rubber button 46 having a stem pulled through an aperture in the frame engages the spring 43 to damp the vibration and silence the spring.

The detent lever 23 has an ear 47 connected to the selector valve operating wire 48 which moves in the sheath 49 suitably secured to the frame by nuts 51.

The park bell crank lever 56 is pivoted at its center by a pivot pin 57 fixed to a portion 58 of the support frame 33. The park lever 56 is connected at one end by a pin 59 to the cable 61 which operates in sheath 62 anchored to a portion of the frame by nuts 63. The other end of the lever 56 has a recess 66 having opposed bearing portions 67 which are always in small clearance engagement with the sides of the outer portion 69 of the hinged lever 16 and provide a pivotal connection between the hinged lever and the park lever so that when the hinged lever is swung laterally the park lever is rotated to move the park control cable 61 from the normal position, FIGURE 3, to the park position, FIGURE 4. The recess 66 has an enlarged inner portion 71 to provide clearance so that the latch projection 72 on the hinged lever 16 does not limit the movement of these parts.

The latch projection 72 on the hinged lever 16 cooperates with the guide slot 73 in the guide plate 74 which is fixed to the frame support 33. When the control handle 11 and hinged plate 16 are in the normal or non-park position shown in FIGURE 3, the latch projection 72 is in the dotted line position, as shown in FIGURE 5 to the left of the edge 76 of the guide plate 74 permitting free swinging movement of the control handle 11 and hinged plate 16 and about the rotary support pin 32 to the low, drive, neutral and reverse positions, as determined by the detent mechanism. The hand lever 11 and hinged plate 16 cannot be swung from the normal position, FIGURE 3, to the lateral position, FIGURE 4, in the low, drive and reverse positions, since the latch projection 72 cannot move to the right from the dotted line position shown in FIGURE 5 because it will abut the edge 76 of guide plate 74. When the hinged plate 16 is in the neutral position, the cam projection 72 will be in the dotted line position, FIGURE 5. The cam surface 77 of guide slot 73 will prevent accidental movement of the hinged plate 16 to the lateral or park position since the latch projection 72 will engage the cam sloped surface 77. However, the operator may move the hand lever 11 to swing the hinged plate 16 to move the latch projection 72 against the slope 77 to cam the projection 72 downwardly, or preferably the cam slope is steep enough that he must lift the lever slightly to clear this cam surface 77 for normal easy shifting movement. This slight rotary movement of the hinged plate 16, required so that the latch projection 72 clears the cam slope 77, causes a small rotary movement of the hinged plate 16 against the biasing force of the detent roller 38 acting on the side of the slope of the detent notch N and thus loads the biasing spring 43 and provides a biasing force on the detent lever 23, tending to move the detent lever and the hinged lever 16 to move the cam projection 72 upwardly into the full line position shown in FIGURE 5 in the locking recess 78. The sloped cam surface 79 at the lower side of the recess 73 will tend to cam the projection 78 up into the recess 72. The lateral swinging of the hinged plate 16 through the pivotal connection provided by the opposed bearing portion 67 rotates the park lever 56 on pin 57 to move the park control cable 61 from the normal off park position, FIGURE 3, to the park position, FIGURE 4.

This control linkage arrangement may be operated to provide a first movement of a first controlled member plurality of control positions, such as low, drive, neutral and reverse for a transmission, or any other similar sequence of controlled positions, and a second movement of a second controlled member between a normal position only in selected positions of the first movement, for example, the neutral position, to move the second control to one or more positions, such as a park position. The control handle is rigidly or integrally connected to the hinged plate 16, which is connected to the detent plate 23 by a hinge having the axis of its pivot pin 24 transverse to the axis of pivot shaft 32 rotatably mounting this assembly on the support. With the control handle in the normal position, FIGURE 3, the latch projection 72 and guide plate 74 will permit rotation of the assembly. Thus, rotary movement of the control handle 11 rotates the hinged and detent lever assembly about the axis of pivot shaft 32 to a plurality of positions, each being located and determined by the detent mechanism. The detent mechanism has a spring 43 biasing the lever 39 to move the detent roller into each of the recesses, low L, drive D, neutral N and reverse R, in the detent plate lever 23 to bias the control assembly consisting of the handle, the hinged lever, the detent lever from closely adjacent positions to each of these positions and resiliently hold this assembly in each position. When the control handle 11 is in the neutral position, it may be moved from the normal position, FIGURE 3, to the park position, FIGURE 4, by a slight rotary movement so that the projection 72 clears the cam surface 77. This slight rotary movement is against the biasing force of the detent mechanism and thus provides a biasing force to resiliently bias and hold the projection 72 in the latching recess 78 to prevent accidental movement of the control out of the park position.

A conventional shift control switch assembly 86 is mounted on a portion of support frame 22 and controlled by a rod 87 pivotally connected to the detent lever. A portion 88 of the support frame prevents the wires leading to this switch being caught in this control mechanism.

The above described preferred embodiment is illustrative of the invention and may be modified within the terms of the appended claims.

We claim:

1. In a control linkage, a support, a detent lever mounted on said support for a first control movement, detent means operatively connected to said support and said detent lever for releasably holding said detent lever in each of a plurality of positions, a control lever movably mounted on said detent lever for movement with said first control movement of said detent lever and for a second control movement relative to said first control movement, a first and a second controlled element, first control means connecting said control lever to said first controlled element to move said first controlled element in response to said first control movement of said detent lever and said control lever, second control means connecting said control lever to said second controlled element to move said second controlled element in response to said second movement of said control lever, and interlock means on said control lever and support blocking said second movement of said control lever when said control lever is in selected positions of said first movement and permitting said second movement of said control lever when said control lever is in another position of said first movement.

2. The invention defined in claim 1 and said detent means having means biasing said detent lever to a selected position, said interlock means requiring a small degree of said first movement against a biasing force of said detent means during said second movement.

3. In a control linkage; a support; control lever means pivotally mounted on said support for rotary movement to a plurality of rotary positions and for lateral swinging movement from a normal position to a lateral position, detent means operatively connected to said control lever means and said support for releasably holding said control lever means in each of said plurality of rotary positions and rotatably biasing the control lever means from a position closely adjacent one of said positions to said one position, a first and a second controlled element, first connecting means connecting said control lever means to said first controlled element to move said first controlled element in response to rotary movement of said control lever means, second connecting means connecting said control lever means to said second controlled element to move said second controlled element in response to swinging movement of said control lever means, guide means including latch means on said control lever means and said support blocking lateral swinging movement of said control lever in selected rotary positions and permitting lateral swinging movement of said control lever means from a normal position to a lateral position when said control lever means is in another rotary position.

4. In a control linkage; a support; control lever means pivotally mounted on said support for rotary movement to a plurality of rotary positions and for lateral swinging movement from a normal position to a lateral position, detent means operatively connected to said control lever means and said support for releasably holding said control lever means in each of said plurality of rotary positions and rotatably biasing the control lever means from a position closely adjacent one of said positions to said one position, a first and a second controlled element, first connecting means connecting said control lever means to said first controlled element to move said frst controlled element in response to rotary movement of said control lever means, second connecting means connecting said control lever means to said second controlled element to move said second controlled element in response to swinging movement of said control lever means, guide means including latch means on said control lever means and said support for blocking lateral swinging movement of said control lever means in selected rotary positions and permitting lateral swinging movement of said control lever means from a normal position to a lateral position when said control lever means is in another rotary position and said latch means having cam means operative in response to said lateral swinging movement of said control lever means for rotating said control lever means from another rotary position to a closely adjacent position against the bias of said detent means and said bias of said detent means urging said control lever means toward said other rotary position biasing said control lever means into engagement with said latch means to hold said control lever means in said lateral position.

5. In a control linkage; a support; control lever means pivotally mounted on said support for rotary movement to a plurality of rotary positions and for lateral swinging movement from a normal position to a lateral position, detent means operatively connected to said control lever means and said suport for releasably holding said control lever means in each of said plurality of rotary positions and rotatably biasing control lever means from a position closely adjacent one of said positions to said one position, a first and a second controlled element, first connecting means connecting said control lever means to said first controlled element to move said first controlled element in response to rotary movement of said control lever means, second connecting means connecting said control lever means to said second controlled element to move said second controlled element in response to swinging movement of said control lever means, guide means including latch means on said control lever means and said support permitting lateral swinging movement of said control lever means from a normal position to a lateral position only when said control lever means is in said one rotary position and said latch means having cam means operative in response to said lateral swinging movement of said control lever means for rotating said control lever means from said one rotary position to a closely adjacent position against the bias of said detent means and said bias of said detent means urging said control lever means toward said other rotary position biasing said control lever means into engagement with said latch means to hold said control lever in said lateral position and said one rotary position.

6. In a control linkage, a support, a detent lever pivotally mounted on said support, detent means operatively connected to said support and said detent lever for releasably holding said detent lever in each of a plurality of rotary positions and rotatably biasing said detent lever from a position closely adjacent one position to said one position, a control lever hinged to said detent lever for rotary movement with said detent lever and lateral swinging movement, a first and a second controlled element, first means connecting said control lever to said first controlled element to reciprocate said first controlled element in response to rotary movement of said control lever, second means connecting said control lever to said second controlled element to reciprocate said second controlled element in response to swinging movement of said control lever, guide means on said control lever and support permitting lateral swinging movement of said control lever from a normal position to a lateral position only when said control lever is in said one rotary position and said latch means having cam means operative in response to said lateral swinging movement of said control lever means for rotating said control lever means from said one rotary position to a closely adjacent position against the bias of said detent means and latch means engaged by said control lever in said lateral position and retained in said lateral position by said bias of said detent means urging said control lever into engagement with said latch means.

7. In a control linkage, a support, a detent lever pivotally mounted on said support, detent means operatively connected to said support and said detent lever for releasably holding said detent lever in each of a plurality of rotary positions and rotatably biasing said detent lever from positions closely adjacent each position to each of said positions, a control lever hinged to said detent lever for rotary movement with said detent lever and lateral swinging movement between a normal and a lateral position, a first and a second controlled element, first means connecting said control lever to said first controlled element to move said first controlled element in response to rotary movement of said control lever, second means connecting said control lever to said second controlled element to move said second controlled element in response to swinging movement of said control lever, a cam on said control lever, guide means on said support cooperating with said cam for permitting lateral swinging movement of said control lever from said normal position to said lateral position only when said control lever is in one rotary position and said latch means having cam means operative in response to said lateral swinging movement of said control lever means for rotating said control lever means from said one rotary position to a closely adjacent position against the bias of said detent means and latch means on said support to engage said cam and hold said control lever in said lateral position and said bias of said detent means urging said control lever into engagement with said latch means to lock said control lever in said lateral position.

8. In a control linkage; a support; a detent lever pivotally mounted on said support for rotary movement to a plurality of rotary positions; detent means operatively connected to said support and said detent lever for releasably holding said detent lever in each of said plurality of rotary positions and rotatably biasing said detent lever from a position closely adjacent one position to said one position; a control lever hinged to said detent lever for rotary movement with said detent lever and lateral swinging movement from a normal position to a lateral position; a first and a second controlled element; first means connecting said control lever to said first controlled element to move said first controlled element in response to rotary movement of said control lever; second means connecting said control lever to said second controlled element to move said second controlled element in response to swinging movement of said control lever; and guide means including latch means on said control lever and support permitting lateral swinging movement of said control lever from said normal position to said lateral position only when said control lever is in said one rotary position and said latch means having cam means operative in response to said lateral swinging movement of said control lever means for rotating said control lever means from said one rotary position to a closely adjacent position against the bias of said detent means and said bias of said detent means urging said control lever into engagement with said latch means to hold said control lever in said lateral position and said one rotary position.

9. In a control linkage; a support; a detent lever pivotally mounted on said support for rotary movement to a plurality of rotary positions; detent means operatively connected to said support and said detent lever for releasably holding said detent lever in each of said plurality of rotary positions and rotatably biasing said detent lever from a position closely adjacent one position to said one position; a control lever hinged to said detent lever for rotary movement with said detent lever and lateral swinging movement from a normal position to a lateral position; a first and a second controlled element; first means connecting said control lever to said first controlled element to move said first controlled element in response to rotary movement of said control lever; a second means connecting said control lever to said second controlled element to move said second controlled element in response to swinging movement of said control lever; and guide means including latch means on said control lever and support permitting lateral swinging movement of said control lever from said normal position to said lateral positions and said latch means having cam means operative in response to said lateral swinging movement of said control lever means for rotating said control lever means from another rotary position to a closely adjacent position against the bias of said detent means and said bias of said detent means urging said control lever into engagement with said latch means to hold said control lever in said lateral position.

10. In a control linkage; a support; a detent lever mounted on said support for a first control movement; detent means operatively connected to said support and said detent lever for releasably holding said detent lever in each of a plurality of positions and biasing said detent lever from a position closely adjacent one position to said one position, a control lever movably mounted on said detent lever for coextensive movement with said first control movement of said detent lever and a second control movement relative to said first control movement; a first and a second controlled element; first means connecting said control lever to said first controlled element to move said first controlled element in response to said first control movement of said detent lever and said control lever; second means connecting said control lever to said second controlled element to move said second controlled element in response to said second control movement of said control lever; and guide means including latch means on said control lever and support permitting said second control movement of said control lever from a normal position to a second position only when said control lever is in said one position and said latch means having cam means operative in response to said lateral swinging movement of said control lever means for rotating said control lever means from said one rotary position to a closely adjacent position against the bias of said detent means and said bias of said detent means urging said control lever into engagement with said latch means to hold said control lever in said second position and said one position.

11. In a control linkage; a support; a detent lever mounted on said support for a first control movement; detent means operatively connected to said support and said detent lever for releasably holding said detent lever in each of a plurality of positions and biasing said detent lever from a position closely adjacent one position to said one position; a control lever movably mounted on said detent lever for coextensive movement with said first control movement of said detent lever and a second control movement relative to said first control movement; a first and a second controlled element; first means connecting said control lever to said first controlled element to move said first controlled element in response to said first control movement of said detent lever and said control lever; second means connecting said control lever to said second controlled element to move said second controlled element in response to said second control movement of said control lever; and guide means including latch means on said control lever and support permitting said second control movement of said control lever from a normal position to a second position and said latch means having cam means operative in response to said lateral swinging movement of said control lever means for rotating said control lever means from another rotary position to a closely adjacent position against the bias of said detent means and said bias of said detent means urging said control lever into engagement with said latch means to hold said control lever in said second position.

References Cited by the Examiner

UNITED STATES PATENTS

| | | | |
|---|---|---|---|
| 2,804,782 | 9/57 | Erxleben | 74—472.2 |
| 2,964,964 | 12/60 | Craig | 74—473 |

BROUGHTON G. DURHAM, *Primary Examiner.*